US 6,651,986 B2

(12) United States Patent
Chevrette et al.

(10) Patent No.: US 6,651,986 B2
(45) Date of Patent: Nov. 25, 2003

(54) RETRACTABLE PACKING RING LOWER HALF SEGMENT RETAINING KEY AND METHOD FOR RETAINING RETRACTABLE PACKING RING LOWER HALF SEGMENT

(75) Inventors: Richard Jon Chevrette, Troy, NY (US); David Robert Skinner, Pattersonville, NY (US); George Horner Kirby, II, Charlton, NY (US); Christopher Edward Wolfe, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 11 days.

(21) Appl. No.: 10/057,930

(22) Filed: Jan. 29, 2002

(65) Prior Publication Data

US 2003/0141669 A1 Jul. 31, 2003

(51) Int. Cl.$^7$ .......................... F16J 15/447; F16J 15/54
(52) U.S. Cl. ..................... 277/421; 277/416; 277/546
(58) Field of Search ........................ 277/411, 416, 277/543, 546, 548, 421, 409

(56) References Cited

U.S. PATENT DOCUMENTS

| 2,600,991 A | * | 6/1952 | Hargrove ............... 277/416 |
| 3,711,104 A | * | 1/1973 | Henry ................... 277/546 |
| 4,436,311 A | * | 3/1984 | Brandon ................ 277/413 |
| 5,374,068 A | | 12/1994 | Jewett et al. |
| 5,395,124 A | * | 3/1995 | Brandon ................ 277/413 |
| 5,464,226 A | * | 11/1995 | Dalton .................. 277/412 |
| 5,503,405 A | | 4/1996 | Jewett et al. |
| 5,509,780 A | | 4/1996 | Synfelt |
| 5,709,388 A | | 1/1998 | Skinner et al. |
| 5,810,365 A | * | 9/1998 | Brandon et al. ........ 277/416 |
| 5,980,204 A | | 11/1999 | Chevrette et al. |
| 6,022,027 A | | 2/2000 | Chevrette et al. |
| 6,030,175 A | * | 2/2000 | Bagepalli et al. ...... 415/173.3 |
| 6,065,754 A | | 5/2000 | Cromer et al. |
| 6,131,910 A | | 10/2000 | Bagepalli et al. |
| 6,250,640 B1 | | 6/2001 | Wolfe et al. |
| 6,250,641 B1 | | 6/2001 | Dinc et al. |

* cited by examiner

Primary Examiner—Lloyd A. Gall
Assistant Examiner—Michael J. Kyle
(74) Attorney, Agent, or Firm—Nixon & Vanderhye PC

(57) ABSTRACT

A rotary machine has a stationary component with circumferential grooves and a rotatable component, as well as annular packing or sealing ring segments movable toward and away from the rotating component. To prevent circumferential displacement of the lower side packing ring segments by gravity forces and enable the lowermost segment in the lower housing to be moved radially inwardly, the side segments of the lower housing are supported adjacent the casing midline in a manner preventing downward movement and enabling horizontal movement. In an exemplary embodiment, the lower side packing ring segment is elongated so as to extend above the horizontal joint of the housing and a key bar extends from a key bar groove in the housing to engage a corresponding groove in the segment. The key bar may be disposed to define a seal key for the horizontal joint.

26 Claims, 5 Drawing Sheets

RETRACTABLE PACKING RING LOWER HALF SEGMENT RETAINING KEY AND METHOD FOR RETAINING RETRACTABLE PACKING RING LOWER HALF SEGMENT

BACKGROUND OF THE INVENTION

In rotary machines such as turbines, seals are provided between rotating and stationary components. For example, in steam turbines it is customary to provide a plurality of arcuate packing ring segments (sometimes referred to as seal ring segments) to form a labyrinth seal between the stationary and rotating components. Typically, the arcuate packing ring segments are disposed in an annular groove in the stationary component concentric to the axis of rotation of the machine and hence concentric to the sealing surface of the rotating component. Each arcuate seal segment carries an arcuate seal face in opposition to the sealing surface of the rotating component. In labyrinth-type seals, the seal faces carry a radially directed array of axially spaced teeth that are radially spaced from an array of axially spaced annular grooves forming the sealing surface of the rotating component. Alternatively, the rotating component may have a smooth surface in radial opposition to the array of teeth on the seal faces. The sealing function is achieved by creating turbulent flow of a working media, for example, steam, as it passes through the relatively tight clearances within the labyrinth defined by the seal face teeth and the opposing surface of the rotating component.

In a typical installation, the annular groove is dovetail-shaped, having locating flanges directed axially toward one another and defining a slot therebetween. The stationary component (e.g., a housing or casing) is typically split lengthwise along a generally horizontal extending midline defining upper and lower halves of the stationary housing. Thus, the semi-annular dovetail grooves receive portions of the arcuate packing ring segments. The packing ring segments are similarly dovetail-shaped, having a pair of flanges directed axially away from one another for disposition within the dovetail groove and a neck which joins the seal face and the flanges of the segment and passes through the slot defined by the locating flanges of the groove. The neck carries the arcuate seal face radially inwardly of the groove when each segment is installed.

In positive pressure, variable clearance type packing rings, the segments are typically spring biased into outer or large clearance positions with the seal faces carried thereby spaced substantially outwardly of the rotary component. Thus, for example, at startup of the machine, the springs displace the segments radially outwardly. After start-up, the working fluid medium, e.g., steam, is inlet to the grooves of the stationary component, biasing the segments to move inwardly against the bias of the springs toward the inner or small clearance positions. It will be appreciated that when the segments are retracted to their large clearance positions during startup and turbine shutdown by the springs, the gaps between the end faces of adjoining segments become increasingly greater. Conversely, when the segments are displaced inwardly, the gaps between the end faces of the segments decrease substantially to a fully-closed position when the segments obtain their smallest diameter. To accommodate the inward and outward movement of the segments, the segments are disposed within the grooves of the stationary component in a sliding or piston-fit arrangement.

In an effort to avoid possible hang-up or binding of the seal segments due to uneven friction forces and potentially open up large leakage gaps in comparison with the more conventional fixed or spring backed positive pressure packing ring segments, another form of a variable clearance packing ring seal between stationary and rotating components has been proposed which uses thermal expansion characteristics of the various elements to enable a large seal clearance between the packing ring segment sealing face and the rotating component at start-up, while ensuring a small clearance and minimal inter-segment leakage therebetween at steady-state operation (See U.S. Pat. No. 6,065,754, the entire disclosure of which is incorporated herein by this reference). According to that patent, there is provided a packing ring segment having a lower coefficient of thermal expansion than a seal holder, i.e., the stationary component, typically a turbine housing or packing casing. Also provided is a centering ring having a greater coefficient of thermal expansion than the seal holder. A pair of centering rings are provided on axially opposite sides of the neck of the packing ring segments and are supported by the stationary component, for example, by reroundable dowels affixed to the seal holder and projecting in an axial direction into the dovetail cavity. The packing ring segment is supported by the centering rings and each segment is biased radially inwardly by springs acting between the segments and the stationary component. The packing ring segments engage contact surfaces on the opposite ends of the centering rings to maintain a large clearance position at start-up between the seal faces of the segments and the rotary component. In that position, the segment ends are closed.

The centering rings have a greater coefficient of thermal expansion than the seal holder, rotor and packing ring segments. After start-up and as the temperature rises, the centering rings thermally expand in a circumferential direction to a greater extent than the packing ring segment. The contact surfaces, forming the support points for the packing ring segment on the center rings, are therefore shifted circumferentially to enable the packing ring segment to be displaced radially inwardly. As the machine reaches steady-state operation, the packing ring segments engage the outer surface of uniform diameter of the center rings, thus assuring concentricity of the packing ring segment sealing uniform clearance between the sealing faces of the segments and the rotary component and opening end gaps between the seal segments. The result is a uniform clearance seal that retains its labyrinth tooth geometry during start-up and a steady-state operation and has minimal bias leakage.

When the rotary machine (e.g., steam turbine) is at rest, for example, prior to startup, the segments, lying in their largest radially outward position, have been observed to slide along the circumferential groove of the stationary component in a downward direction under the action of gravity forces. As a consequence, an accumulation of clearances between the end faces of the segments appears in the upper housing, while the lower segments become closer, i.e., butting end-to-end. For example, when six segments are employed in a rotary machine, three segments are typically disposed in the upper housing of the stationary casing and three segments are disposed in the lower housing, i.e., respectively above and below the horizontal midline or splitline of the machine casing. Prior to startup, the side segments in the upper housing and the side segments of the lower housing may slide under the action of gravity forces such that the side segments of the lower housing engage the lowermost central segment in the lower housing of the machine, with the accumulated clearance between the end faces appearing between the uppermost segment in the upper housing and one or both of the side segments of the upper housing.

Upon startup, the segments are designed to move from their radially outward positions to their radially inward positions. Because of the effect of gravity, the segments tend to move in sequence. First, the top segment moves radially inwardly, followed by the side segments of the upper housing. The side segments of the lower housing then move radially inwardly, followed by the lowermost segment. It has been found, however, that because the segments become displaced circumferentially about the groove of the stationary component by gravity forces, the inward movement of the side segments of the lower housing of the stationary component, essentially in an upward and inward radial direction, can preclude or block radial inward (upward) movement of the lowermost segment. That is, the fluid pressure forces tending to displace the lowermost segment radially inwardly are insufficient to displace the lower side segments in a generally upward circumferential direction to enable the lowermost segment to move into its radially innermost position. Consequently, the lowermost segment remains radially displaced from its designed radially inward position resulting in a larger than desired clearance between its sealing face and the rotary component.

Thus, variable clearance positive pressure packing rings require both upper and lower support methods. These support methods have four design criteria that are generally considered to be critical to quality (the "CTQ"): A) retain the upper packing rings during installation; B) prevent rotation of the packings due to windage or rubs; C) control the butt-clearance at the horizontal joints for both the upper and lower half sections; and D) prevent pinching out of the lower packing ring section in the lower half.

A variety of methods have heretofore been used for to retain upper packing rings, including: (A) a support bar which is bolted to the housing (See U.S. Pat. No. 5,709,388); (B) an axial dowel-type pin that intersects both the housing and the packing ring located in the upper half; and (C) an axial rivet, which is similar to the type B method. Lower segment retention has been more problematic.

Attempts have been made to accommodate the gravity forces acting on seal segments. See, for example, U.S. Pat. Nos. 5,464,226 and 5,395,124, the disclosures of which are incorporated herein by this reference. In the latter patent, so-called gravity springs are disposed in the stationary component to apply an upward biasing force to the seal segments in the lower housing. These gravity springs engage the seal segments intermediate their ends and at their centers of gravity. The seal segments, moreover, are provided with circumferential springs between the adjoining end faces, as well as between the end faces adjacent the horizontal midline. Anti-rotation keys are fixed to the upper and lower housing at the casing midline, the circumferential springs bearing against the anti-rotation keys. Consequently, the seal segments are biased outwardly by the springs between the segment ends and inwardly by fluid pressure forces. When the seal segments move inwardly, the gravity springs function such that the segments have little or no weight, permitting closure of the lower seal segments to the inner position. Thus, the lower seal segments are said to float by virtue of their opposing circumferential and gravity spring forces and such segments move radially inwardly and outwardly. Also, the end circumferential springs bearing against the anti-rotation keys bias the lower seal segments for circumferential displacement within the grooves in contrast to the present invention wherein circumferential displacement of the lower side segments is positively prevented and horizontal, rather than radial, movement of the lower side segments between inner and outer positions is provided.

According to another development, as disclosed in commonly owned U.S. Pat. No. 5,709,388, the disclosure of which is incorporated herein by this reference, a guide is provided for preventing circumferential slippage of the segments about the groove of the stationary components. More specifically, according to the invention of the '388 patent, each of the side segments in the lower housing of the casing is provided with a guide which supports the segment, prevents the segment from circumferential displacement under gravity forces, and enables the segment to slide horizontally between outer large and inner small clearance positions, respectively. In a preferred form, each guide comprises an angle bracket, one leg of which is secured to the outer face of the segment adjacent the end of the segment near the midline of the rotary machine. The generally horizontally projecting other leg of the bracket is received in a recess formed in the interior surface of the stationary component and rests on a stop carried by the stationary component. The stops prevent downward circumferential displacement of the side segments in the groove of the lower housing of the rotary machine and thereby maintain clearance between the butt ends of adjacent packing segments. The bracket also supports the side segments of the lower housing of the machine for movement in a generally horizontal direction toward and away from a vertical plane through the axis of the machine.

BRIEF SUMMARY OF THE INVENTION

To provide added performance to the unit, standard packing rings are desirably replaced with variable clearance positive pressure packing (VCP) of the type described hereinabove. With the replacement of standard packing rings with VCP, a lower ring segment support method must utilized for CTQ "D". However, standard packing ring and housing design utilizing the doweled pin upper section retention method or the other methods mentioned above can not have lower variable clearance positive pressure packing (VCP) applied without substantial housing modifications. For example, these modifications would include substantial machining of support bar pockets in the lower half housing part to create a method for supporting a lower half VCP sections, as described in U.S. Pat. No. 5,709,388. The housing modifications increase power plant outage cycle time by forcing the lower half housing parts to be removed and most often machined off-site, thus increasing the cost of the conversion process.

To apply VCP to housings currently utilizing standard retractable packing rings with minimal lower half housing modifications, the present invention proposes to utilize the existing housing horizontal joint seal key assemblies for lower half VCP section retainment, thus reducing the power plant outage cycle time and reducing outage costs. The retention assembly thus provided also reduces the number of parts required for retention and provides a more simple design than the prior art.

Thus, the invention is embodied in an apparatus for preventing circumferential displacement of a lower half packing ring side segment mounted to a stationary component of a rotary machine having a component rotatable about a rotary axis, the stationary component having an annular groove about the axis, at least one axially directed locating flange about the axis and in part defining a slot opening into the annular groove, the stationary component being defined by upper and lower half housing parts secured to define a horizontal midline joint, the apparatus comprising: a lower side segment body for forming a lower side segment one of a plurality of annular segments about the axis of the machine and for partial disposition in the annular groove of the stationary component; the lower side segment body having upper and lower circumferential ends, an arcuate seal face, at least one axially directed flange for disposition in the annular groove, a neck portion receivable in the slot and interconnecting the flange and the seal face, and a length so as to extend circumferentially beyond, so that the upper circumferential end is disposed vertically above, the horizontal midline joint of the stationary component; and a key bar member secured to the stationary component and projecting into the annular groove for engagement with a key bar receptacle defined in a radially outer surface of the lower side segment body, adjacent the upper circumferential end, for preventing downward circumferential displacement of the lower side segment body in the annular groove.

In an exemplary embodiment a part of the key bar member is disposed in a key bar groove defined in the stationary component.

The invention is also embodied in a rotary machine comprising: a component rotatable about an axis; a stationary component including an annular groove about the axis, at least one axially directed locating flange about the axis and in part defining a slot opening into the annular groove, the stationary component being defined by upper and lower half housing parts secured to define a horizontal midline joint; a plurality of generally annular packing ring segments disposed about the axis, each segment having an arcuate seal face, at least one axially directed flange disposed in the annular groove and a neck portion in the slot and interconnecting the flange and the seal face; certain of the plurality of packing ring segments being movable between radial outward and radial inward positions relative to the axis, including a lower side segment defining a lower side one of a plurality of annular segments about the axis of the machine; the lower side segment having upper and lower circumferential ends and a length so as to extend circumferentially beyond, so that the upper circumferential end is disposed vertically above, the horizontal midline joint of the stationary component; and a key bar member secured to the stationary component and projecting generally radially inwardly therefrom for engagement with a key bar receptacle defined in a radially outer surface of the lower side segment body, adjacent the upper circumferential end, for preventing downward circumferential displacement of the lower side segment body in the annular groove.

The invention also relates to and may thus be embodied in a method of mounting a variable clearance positive pressure packing to a stationary component of a rotary machine having a component rotatable about a rotary axis, the stationary component having an annular groove about the axis, at least one axially directed locating flange about the axis and in part defining a slot opening into the annular groove, the stationary component being defined by upper and lower half housing parts secured to define a horizontal midline joint, the method comprising the steps of: providing a lower side segment body for forming a lower side segment one of a plurality of annular segments about the axis of the machine, the lower side segment body having upper and lower circumferential ends, an arcuate seal face, at least one axially directed flange for disposition in the annular groove, a neck portion receivable in the slot and interconnecting the flange and the seal face; partially disposing the lower side segment body in the annular groove of the stationary component by slidably engaging the at least one axially directed flange with the annular groove, the lower side segment body having a length so as to extend circumferentially beyond, so that the upper circumferential end is disposed vertically above, the horizontal midline joint of the stationary component; engaging a key bar member with a key bar receptacle defined in a radially outer surface of the lower side segment body, adjacent the upper circumferential end; and securing the key bar member to the stationary component to prevent downward circumferential displacement of the lower side segment body in the annular groove.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
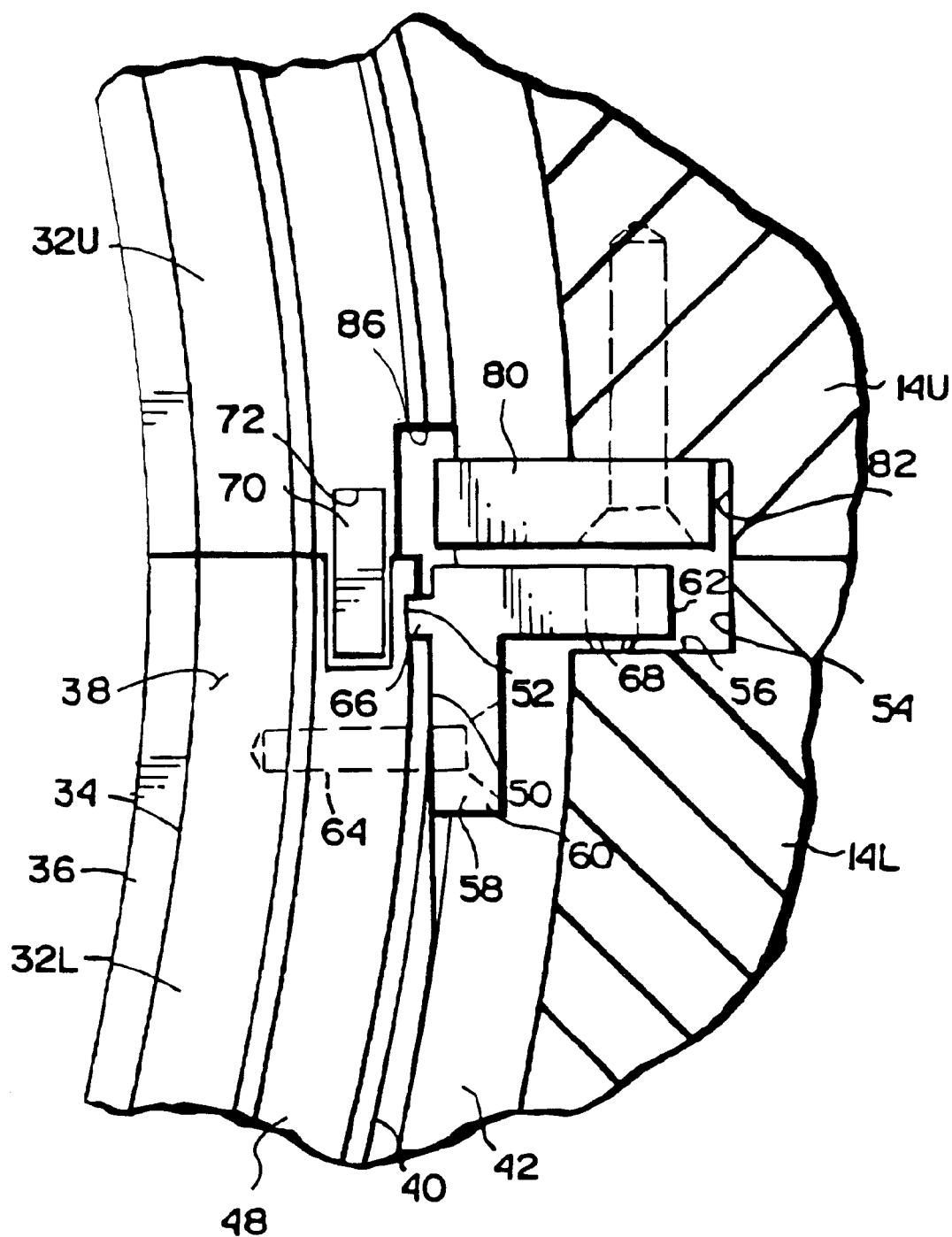
FIG. 1 is an enlarged fragmentary cross-sectional view taken axially along a mid-line and one side of a rotary machine illustrating a prior art segment retention assembly wherein a support bar is bolted to the housing for upper section retention.

A conventional seal, and a prior art segment retention assembly will now be described with reference to FIG. 1, which illustrates the assembly disclosed in U.S. Pat. No. 5,709,388.

In a typical rotary machine, such as a steam turbine, a rotary component is supported for rotation within a housing. A multi-stage labyrinth seal including a plurality of packing rings are disposed about the turbine shaft for separating high and lower pressure regions. Each packing ring is formed in an annular array of a plurality of arcuate seal elements. In general, the labyrinth seal functions by placing a relatively large number of partial barriers to the flow of steam from the high pressure region to the low pressure region. Each barrier forces steam attempting to flow parallel to the axis of the turbine shaft to follow a tortuous path whereby a pressure drop is created. Thus, each packing ring segment 32U, 32L thus has a sealing face 34 with projecting radial teeth 36. The sealing face 34 is formed by a pair of flanges 38 extending axially away from one another, although it will be appreciated that only one such flange 38 is necessary in certain applications. The outer portions of the packing ring segments 32 include locating hooks or flanges 40 which similarly extend from segment 32 in axially opposite directions away from one another.

The stationary component, i.e., turbine housing 14U, 14L, has a generally dovetail-shaped annular groove or slot 42 at each axial location of the seal. The annular groove 42 is located along radially innermost portions of the housing 14 by a pair of locating flanges (See FIGS. 4, 6 and 8) that extend axially toward one another to define a slot therebetween. A neck 48 of each segment 32 interconnects the locating flanges or hooks 40 and the sealing face defining flanges 38 and extends through the slot.

It will be appreciated that in the assembly of FIG. 1, and the remaining figures, the segments comprise positive pressure, variable clearance packing ring segments movable between open outermost large clearance and closed innermost small clearance positions about the rotary component, e.g., the turbine shaft, at startup and at speed operations, respectively. The segments may be moved to their open, outermost largest diameter positions by springs (not shown) disposed between the locating flanges or hooks 40 of the segments and the locating flanges of the stationary component 14. To displace the segments into their closed smaller diameter position, a plurality of passages, not shown, are provided in the stationary component or segments to introduce the flowing medium, for example, steam, in the groove 42 and along the outer face of the segments whereby the segments may be displaced inwardly toward the rotary component against the bias of the springs. This type of positive pressure variable clearance packing ring segment is conventional in the art, for example, as described and illustrated in U.S. Pat. No. 4,374,068 of common assignee herewith, the disclosure of which patent is incorporated herein by reference. In the alternative, the variable clearance packing ring seal uses the thermal expansion characteristics of the various elements as described in U.S. Pat. No. 6,065,754 to enable a large seal clearance between the packing ring segment sealing face and the rotating component at start-up, while ensuring a small clearance and minimal inter-segment leakage therebetween at steady-state operation.

Referring now more specifically to the prior art retention assembly of FIG. 1, the upper and lower ends of the side segments 32L and 32U are illustrated in conjunction with the upper and lower housings 14U and 14L, respectively, of the casing. To support the lower side segments 32L against circumferential displacement under gravity forces when in their open positions relative to the rotary component, the outer face of each segment 32L between the locating hooks 40 and adjacent its upper end is provided with a flat surface 50 and a recess 52. Additionally, a groove 54 is formed along the inner surface of the stationary component 14L adjacent the midline of the housings 14U and 14L to form a stop or ledge 56. An angle bracket 58 having legs 60 and 62 engages between the segment 32L and the lower housing of the stationary component. Leg 60 receives a bolt 64 for securing the bracket 58 to the upper end of the lowermost segment 32L. A projection 66 along the inner face of the leg 60 engages in the recess 52 of the segment 32L to stabilize the bracket. The other leg 62 of the bracket 60 has an adjustable set screw 68 which extends below the lower surface of leg 62 for engagement on stop 56. It will be appreciated from the foregoing and a review of FIG. 1 that the brackets 58 thus support the entirety of the segments 32L against downward circumferential displacement within the groove 42 along opposite sides of the lower housing 14L. Set screw 68 compensates for the normal manufacturing tolerances.

Each bracket 58 is disposed to enable horizontal sliding movement of the associated segment 32L in relation to the rotor of the turbine. Thus, the segments 32L on the opposite sides of the lower housing 14L move horizontally toward and away from a vertical plane through the axis of the shaft between their innermost smallest clearance and outermost largest clearance positions.

As illustrated in FIG. 1, the end faces of the upper and lower side segments 32U and 32L abut one another. A tongue 70 is received in a slot 72 formed in the opposed end faces and maintains the segments 32U and 32L in substantial circumferential alignment with one another. As also illustrated in FIG. 1, a support plate 80 is secured in a matching recess 82 formed along the interior surface of the upper housing 14U at each substantially diametrically opposed side of the upper housing 14U adjacent the midline. Plate 80 is secured by a bolt and projects inwardly to reside in a slot 86 formed along the lower end of the upper side segment 32U. Plate 80 is thus an example of the conventional upper segment retention method B described hereinabove. In this type of assembly, plate 80 is engaged by the side segments 32U upon removal of the upper housing 14U, thus preventing the segments in the upper housing of the stationary component from falling out when the upper housing is removed from the lower housing.

Figure 2:
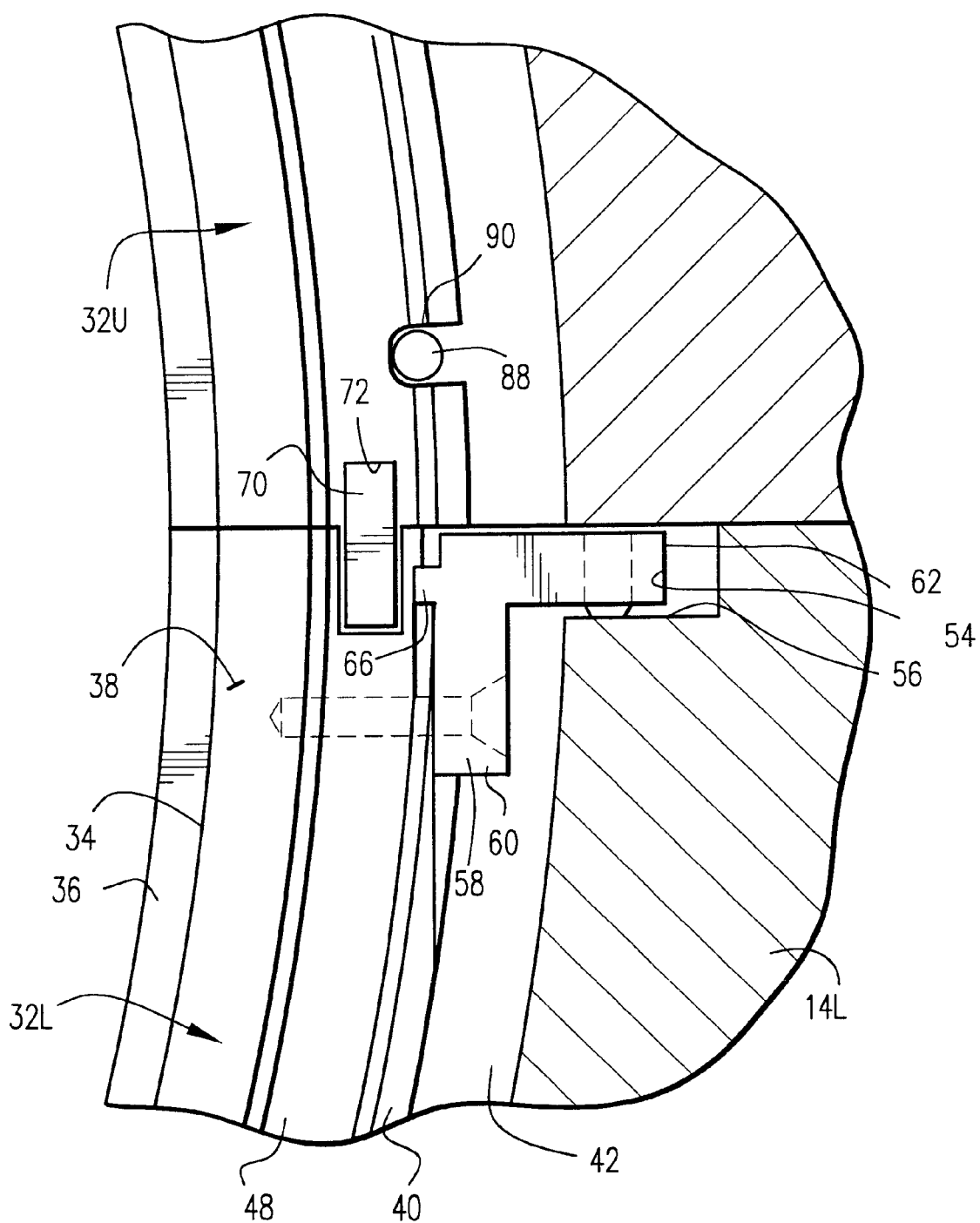
FIG. 2 is an enlarged fragmentary cross-sectional view taken axially along a mid-line and one side of a rotary machine illustrating a prior art segment retention assembly wherein an axial dowel pin is provided for upper section retention.

FIG. 2 illustrates a seal segment assembly similar to that of FIG. 1 so that corresponding components are commonly numbered. However, in the structure illustrated in FIG. 2, rather than using a support bar 80 for retaining the upper half section segment 32U, an axial dowel pin is provided, as shown at 88, to intersect both the upper housing 14U and the packing ring 32U located in the upper half. When an axial dowel-type pin 88 is provided for retaining the upper half section segment, a slot or groove 90 is machined in the upper half section for receiving the dowel pin. The assembly of FIG. 2 otherwise corresponds to the assembly of FIG. 1, so that a description thereof is not repeated here.

As mentioned above, and as is apparent from an examination of FIGS. 1 and 2, the modifications to the housing, and the lower half section segment(s) to accommodate bracket 58 for retaining the lower section includes substantial machining of support bracket pockets in the lower half housing 14L as well as substantially machining of the lower half section segment 32L itself. The housing modifications in particular increase power plant outage cycle time by forcing the lower half housing to be removed and perhaps machined off-site.

The invention is described hereinbelow with reference in particular to a rotary machine in which an axial dowel-type pin upper section retention system is used, but could be applied to the axial rivet method and the support bar method. The doweled pins referenced in the type (B) method satisfy all CTQ criteria except for CTQ "D", as described above.

Most steam turbine units utilize a radial steam seal key at the diaphragm or housing horizontal joint, to prevent steam from leaking across the joint through the stage. This key is typically axially centered at the packing ring dovetail and often times the key groove extends into the packing ring dovetail annular groove with no material ligament. The invention proposes to use this existing seal key groove to accommodate a retention bar, which is in effect a longer steam seal key, replacing the existing steam seal key so that it extends into the annular groove or dovetail slot for the packing ring and into a machined groove within the VCP. It is to be understood that when retrofitting an existing turbine structure, if the existing key groove does not extend into the annular groove, then the existing material ligament would easily be removed using such tools as a hand grinder or other non-precision methods.

Figure 3:
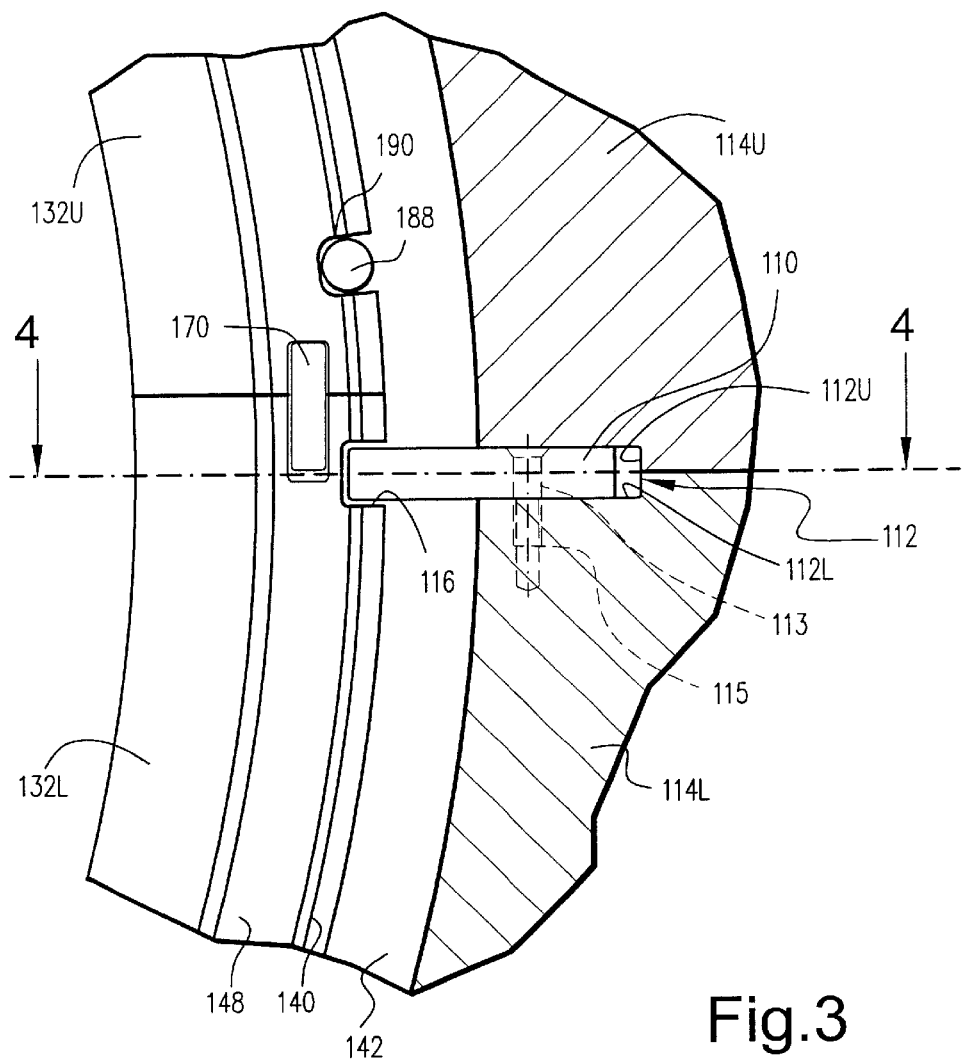
FIG. 3 is an enlarged fragmentary cross-sectional view taken axially along the mid-line and one side of the rotary machine illustrating an exemplary embodiment of the invention.
Figure 4:
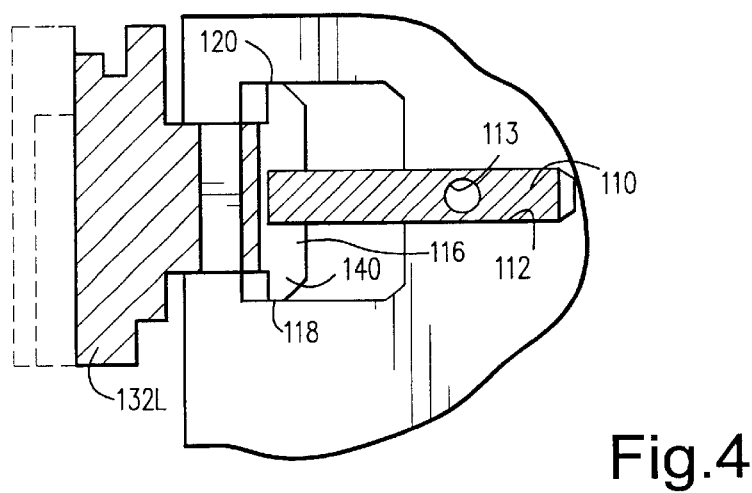
FIG. 4 is a view taken along line 4—4 of FIG. 3.

Thus, as illustrated in FIGS. 3 and 4, according to a first embodiment of the invention, a retaining key bar 110 is disposed in the radial steam seal key groove 112, and secured to the lower housing part. In this embodiment, the existing radial steam seal key groove 112 is defined as upper 112U and lower 112L parts, respectively defined in the upper and lower housing halves 114U and 114L. The retaining key bar 110 is secured to the lower housing half 114L and thus has a bore 113 for accommodating a screw (not shown) that is threaded into a corresponding bore 115 defined in the lower housing 114L.

As mentioned above, the key bar 110 has a length such that it extends into the annular groove 142 and into a machined groove 116 within the seal segment 132L. It is to be noted that in the illustrated embodiment, the seal segment 132L is elongated so as to extend circumferentially beyond the housing horizontal joint so that the key bar receiving groove 116 can be defined in radial alignment with the existing seal key groove 112. Thus, in this embodiment, the VCP upper and lower segment joint is disposed above the unit horizontal joint to allow for a material ligament within the VCP lower segment. The engagement of the key bar 110 with the groove 116 in the lower seal segment retains the lower half seal segment while allowing the lower half segment 132L to slide radially on the key bar 110 between the minimum and maximum clearances thereof during turbine operation, as described above.

In the illustrated embodiment the receptacle for the retainer key bar 110 in the lower seal segment 132L is defined as a groove 116 having a longitudinal axis parallel to the axis of rotation of, and a depth in the radial direction of, the rotating body (not shown) accommodated in the housing or diaphragm 114U, 114L. Another alternative is to machine a radial bore for receiving the key bar, which bore does not extend entirely axially across the dovetail head defined by the locating hooks 140 of the lower seal segment 114L. A groove as illustrated is generally preferred, however, since it is easier to machine and it tolerates manufacturing and placement variances. As generically used herein, radial groove is intended to read on a cutout to accommodate the key bar 110, irrespective of whether it extends to either, both, or neither axial face 118, 120 of the dovetail head of the lower seal segment 132L. The remaining components of the embodiment of FIGS. 3–4 correspond to those of the structures illustrated in FIGS. 1–2 and are thus labeled with corresponding reference numbers, incremented by one hundred, but are not further discussed here.

Thus, in the embodiment of FIGS. 3–4, an existing radial steam seal key groove 112 is used with a new, longer seal key bar 110. The new key bar still acts as a seal but also supports the VCP (lower seal segment) 132L via the groove 116.

Figure 5:
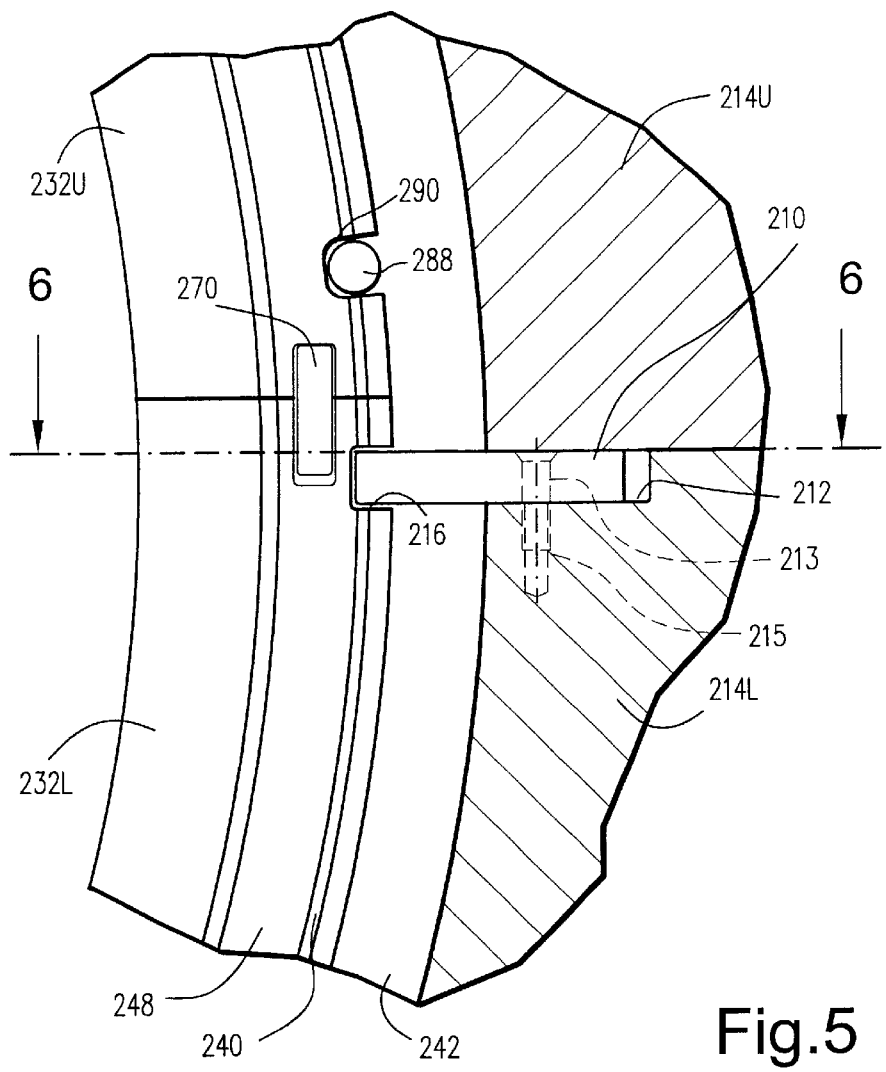
FIG. 5 is an enlarged fragmentary cross-sectional view taken axially along the mid-line and one side of the rotary machine illustrating another embodiment of the invention.
Figure 6:
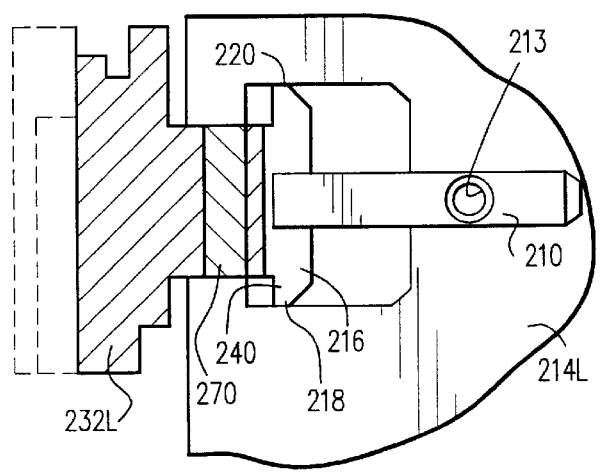
FIG. 6 is a view taken along line 6—6 of FIG. 5.

A second embodiment of the invention is illustrated in FIGS. 5–6. In this embodiment, a key bar is again provided either within an existing part radial steam seal key groove 112L or within such a groove added during retrofit of the VCP. In contrast to the embodiment of FIGS. 3–4, however, the key bar 210 of the embodiment of FIGS. 5–6 does not act as a steam seal in conjunction with supporting the packing segment because it does not extend above horizontal joint of the upper and lower housing halves 214U, 214L. Instead, as illustrated, the groove for accommodating a key bar 210 is defined only in the lower housing 214L, to which it is secured with e.g. a screw (not shown) disposed through aligned bores 213, 215. The remaining components of the embodiment of FIGS. 5–6 correspond to those of the embodiment of FIGS. 3–4 and are thus labeled with corresponding reference numbers, incremented by one hundred, but are not further discussed here.

Figure 7:
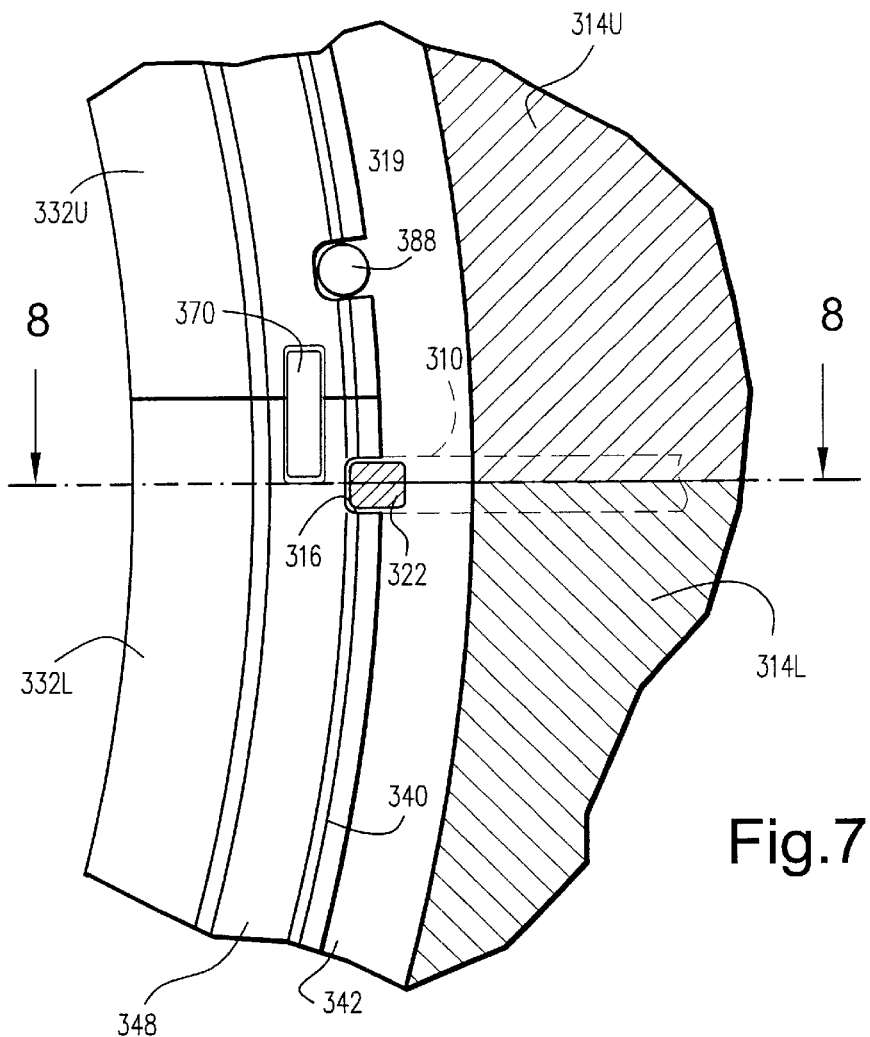
FIG. 7 is an enlarged fragmentary cross-sectional view taken axially along the mid-line and one side of the rotary machine illustrating yet another embodiment of the invention.
Figure 8:
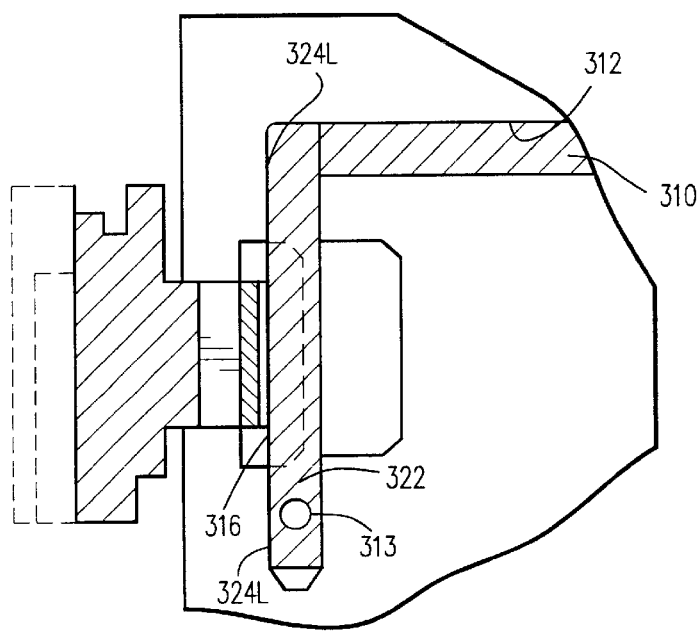
FIG. 8 is a view taken along line 8—8 of FIG. 7.

A third embodiment is illustrated by way example in FIGS. 7–8. In this embodiment, an axial key bar 322 is provided at the horizontal joint of the upper and lower housing halves 314U, 314L to act as both a steam seal and a VCP (lower seal segment) 332L support. In the illustrated adaptation of this embodiment, the axial key bar 322 straddles the horizontal joint so that a part axial key bar groove is defined respectively in the upper and lower housing parts 314U, 314U, the lower part 324L of which can be seen in FIG. 8. In the illustrated embodiment, the key bar 322 is secured to the lower housing half 314L and thus has a bore 313 for accommodating a screw (not shown) that is threaded into a corresponding bore (not shown) defined in the lower housing 314L. As illustrated, the axial key bar 322 must be wide enough (in the radial direction of the turbine) to allow the necessary seal segment travel for proper function. In the illustrated embodiment, the axial key bar 322 is used in conjunction with one or more radial seal keys 310 to provide a proper seal at the horizontal joint.

This embodiment is adapted to the case where, for example, the radial steam seal key 310 is not in line with the existing standard packing, so that the embodiment of FIGS. 3–4 can not be adopted when the existing standard packing is removed and replaced with the VCP segment. As shown, this embodiment is expected to provide for less machining during the housing modification process than might be required to accommodate a bracket 58 or other conventional retention system. Indeed, if desired, the modification to the existing housing can be entirely in the lower half, thus avoiding any machining to the upper half. Even where the axial key 322 is adapted to straddle the horizontal joint, as illustrated in FIG. 7, the material removal is less than that required for the assembly of FIGS. 1–2. In addition, the machining to the ring segment 332L is simpler than used than that required for the method shown in FIGS. 1 and 2.

The remaining components of the embodiment of FIGS. 7–8 correspond to those of the embodiment of FIGS. 3–4 and are thus labeled with corresponding reference numbers, incremented by two hundred, but are not further discussed here.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for preventing circumferential displacement of a lower half packing ring side segment mounted to a stationary component of a rotary machine having a component rotatable about a rotary axis, the stationary component having an annular groove about the axis, at least one axially directed locating flange about the axis and in part defining a slot opening into the annular groove, the stationary component being defined by upper and lower half housing parts secured to define a horizontal midline joint, said apparatus comprising:

a lower side segment body for forming a lower side segment one of a plurality of annular segments about the axis of the machine and for partial disposition in the annular groove of the stationary component;

said lower side segment body having upper and lower circumferential ends, an arcuate seal face, at least one axially directed flange for disposition in the annular groove, a neck portion receivable in the slot and interconnecting said flange and said seal face, and a length so as to extend circumferentially beyond, so that said upper circumferential end is disposed vertically above, said horizontal midline joint of said stationary component; and a key bar member secured to said stationary component and projecting into said annular groove for engagement with a key bar receptacle defined in a radially outer surface of said lower side segment body, adjacent said upper circumferential end, for preventing downward circumferential displacement of the lower side segment body in the annular groove.

2. An apparatus as in claim 1, wherein a part of said key bar member is disposed in a key bar groove defined in said stationary component.

3. An apparatus as in claim 2, wherein said key bar groove extends radially from said annular groove into said stationary component.

4. An apparatus as in claim 2, wherein said key bar groove is defined in an upper surface of said lower half housing part.

5. An apparatus as in claim 2, wherein said key bar member groove is defined in part in an upper surface of said lower half housing part and in part in a lower surface of said upper half housing part.

6. An apparatus as in claim 2, wherein said key bar member is disposed so that a longitudinal axis thereof is generally parallel to said rotary axis.

7. An apparatus as in claim 1, wherein said key bar receptacle of said lower side segment body comprises a groove extending radially into the segment body and extending axially along at least a part of a thickness of said segment body.

8. An apparatus as in claim 1, wherein said lower side segment body has first and second axial faces and wherein said key bar receptacle comprises a groove extending axially to and between said axial faces of said segment body and having a depth extending part radially into the lower side segment body.

9. An apparatus as in claim 1, wherein said key bar member is secured to said lower half housing part.

10. An apparatus as in claim 1, wherein said key bar member straddles said midline joint of said housing so as to define a seal key of the housing.

11. A rotary machine comprising:

a component rotatable about an axis;

a stationary component including an annular groove about said axis, at least one axially directed locating flange about the axis and in part defining a slot opening into the annular groove, the stationary component being defined by upper and lower half housing parts secured to define a horizontal midline joint;

a plurality of generally annular packing ring segments disposed about said axis, each segment having an arcuate seal face, at least one axially directed flange disposed in said annular groove and a neck portion in said slot and interconnecting said flange and said seal face;

certain of said plurality of packing ring segments being movable between radial outward and radial inward positions relative to said axis, including a lower side segment defining a lower side one of a plurality of annular segments about the axis of the machine;

said lower side segment having upper and lower circumferential ends and a length so as to extend circumferentially beyond, so that said upper circumferential end is disposed vertically above, said horizontal midline joint of said stationary component; and a key bar member secured to said stationary component and projecting generally radially inwardly therefrom for engagement with a key bar receptacle defined in a radially outer surface of said lower side segment body, adjacent said upper circumferential end, for preventing downward circumferential displacement of the lower side segment body in the annular groove.

12. An apparatus as in claim 11, wherein a part of said key bar member is disposed in a key bar groove defined in said stationary component.

13. An apparatus as in claim 12, wherein said key bar groove is defined in an upper surface of said lower half housing part.

14. An apparatus as in claim 12, wherein said key bar member groove is defined in part in an upper surface of said lower half housing part and in part in a lower surface of said upper half housing part.

15. An apparatus as in claim 11, wherein said key bar receptacle of said lower side segment body comprises a groove extending radially into the segment body and extending axially along at least a part of a thickness of said segment body.

16. An apparatus as in claim 11, wherein said segment body has first and second axial faces and wherein said key bar receptacle comprises a groove extending axially to and between said axial faces of said segment body and having a depth extending part radially into the lower side segment body.

17. An apparatus as in claim 11, wherein said key bar member is secured to said lower half housing part.

18. An apparatus as in claim 11, wherein said key bar member straddles said midline joint of said housing so as to define a seal key of the housing.

19. A method of mounting a variable clearance positive pressure packing to a stationary component of a rotary machine having a component rotatable about a rotary axis, the stationary component having an annular groove about the axis, at least one axially directed locating flange about the axis and in part defining a slot opening into the annular groove, the stationary component being defined by upper and lower half housing parts secured to define a horizontal midline joint, the method comprising the steps of:

providing a lower side segment body for forming a lower side segment one of a plurality of annular segments about the axis of the machine, said lower side segment body having upper and lower circumferential ends, an arcuate seal face, at least one axially directed flange for disposition in the annular groove, a neck portion receivable in the slot and interconnecting said flange and said seal face;

partially disposing said lower side segment body in the annular groove of the stationary component by slidably engaging said at least one axially directed flange with said annular groove, said lower side segment body having a length so as to extend circumferentially beyond, so that said upper circumferential end is disposed vertically above, said horizontal midline joint of said stationary component;

engaging a key bar member with a key bar receptacle defined in a radially outer surface of said lower side segment body, adjacent said upper circumferential end; and securing said key bar member to said stationary component to prevent downward circumferential displacement of the lower side segment body in the annular groove.

20. A method as in claim 19, further comprising:

removing a radial seal key from a radial seal groove disposed at the housing horizontal joint at a position generally corresponding to an axial position of the annular groove;

wherein said securing step comprises disposing said key bar member in said radial seal groove and securing said key bar member to one of said upper and lower half housing parts, and wherein said key bar member has a length greater than said radial seal key and said radial seal key groove.

21. A method as in claim 19, further comprising the step of disposing a part of said key bar member in a key bar groove defined in said stationary component before said securing step.

22. A method as in claim 21, wherein said key bar groove is defined in an upper surface of said lower half housing part.

23. A method as in claim 21, wherein said key bar member groove is defined in part in an upper surface of said lower half housing part and in part in a lower surface of said upper half housing part.

24. A method as in claim 19, wherein said key bar receptacle of said lower side segment body comprises a groove extending radially into the segment body and extending axially along at least a part of a thickness of said segment body.

25. A method as in claim 19, wherein said segment body has first and second axial faces and wherein said key bar receptacle comprises a groove extending axially to and between said axial faces of said segment body and having a depth extending part radially into the lower side segment body.

26. A method as in claim 19, wherein said securing step comprises securing said key bar member to said lower half housing part.

* * * * *